United States Patent [19]

Seo et al.

[11] Patent Number: 5,240,665
[45] Date of Patent: Aug. 31, 1993

[54] PROCESS OF MAKING CELLULOSE ACETATE FIBERS FROM SPINNING SOLUTIONS CONTAINING METAL OXIDE PRECURSOR

[75] Inventors: Kab S. Seo, Kingsport, Tenn.; Christine J. Landry, Honeoye Falls; Bradley K. Coltrain, Fairport, both of N.Y.; James D. Cloyd, Jonesborough, Tenn.

[73] Assignee: Eastman Kodak Company, Rochester, N.Y.

[21] Appl. No.: 816,338

[22] Filed: Dec. 31, 1991

[51] Int. Cl.$^5$ ................................................ D01F 2/28
[52] U.S. Cl. ..................................... 264/169; 264/200; 264/207; 264/211
[58] Field of Search ............... 264/169, 200, 207, 211; 106/187, 196

[56] References Cited

U.S. PATENT DOCUMENTS

| | | | |
|---|---|---|---|
| 3,038,780 | 6/1962 | Keifer et al. | 264/207 |
| 3,272,638 | 9/1966 | Touey et al. | 106/196 X |
| 3,419,653 | 12/1968 | Briggs et al. | 264/211 X |
| 3,925,525 | 12/1975 | LaNieve | 264/207 |
| 3,952,081 | 4/1976 | Epstein et al. | 264/207 |
| 4,418,026 | 11/1983 | Blackie et al. | 264/207 X |
| 5,010,128 | 4/1991 | Landry et al. | 524/405 |

FOREIGN PATENT DOCUMENTS

| | | | |
|---|---|---|---|
| 285156 | 12/1970 | U.S.S.R. | 264/200 |
| 1414375 | 11/1975 | United Kingdom . | |
| 2167343 | 5/1986 | United Kingdom . | |

OTHER PUBLICATIONS

Abstract of Japan 57-190,645 (published Nov. 24, 1982).
Abstract of U.S.S.R. 423,895 (published Nov. 3, 1974).

*Primary Examiner*—Leo B. Tentoni
*Attorney, Agent, or Firm*—Mark A. Montgomery; William P. Heath, Jr.

[57] ABSTRACT

An improved extrudable solution such as a cellulose acetate/acetone spinning solution is provided containing cellulose ester, solvent, metal oxide precursor, acid, and water. The solution is extruded such as by spinning and produces a shaped article such as a cellulose acetate fiber containing metal oxide interpenetrating networks.

6 Claims, No Drawings

PROCESS OF MAKING CELLULOSE ACETATE FIBERS FROM SPINNING SOLUTIONS CONTAINING METAL OXIDE PRECURSOR

FIELD OF THE INVENTION

The present invention relates to shaped articles such as fibers and films of cellulose esters. The present invention also relates to a production solution capable of producing the shaped articles at increased production speeds. The present invention also relates to a process for producing these shaped articles from the production solution.

BACKGROUND OF THE INVENTION

Shaped articles such as fibers and films of cellulose esters produced by the extrusion of a cellulose ester production solution are well known. Cellulose esters are produced from a cellulosic feedstock such as wood pulp or cotton linters. The cellulose ester is precipitated after acetylation and hydrolysis, is then washed and dried, and then redissolved in cellulose ester solvents such as aqueous acetone, or methylene chloride/alcohol. This solution is then filtered to form a production solution. The shaped articles are then produced from this production solution or extrudable solution by solvent evaporation techniques such as dry spinning to form fibers.

High production speeds are very desirable in that more shaped product can be formed during a set period of time than at lower production speeds. This is particularly important for the production of cellulose acetate fiber from a cellulose acetate/acetone dope solution by the dry spinning technique. Spinning speeds seem to be limited by the residence time required to remove the solvent from the wet filaments through diffusion and evaporation, and by reduced strength of the spinline while large quantities of solvent are present. Spinning speeds are also limited by the presence of non-uninformities in the dope such as particles, rheological inhomogeneities etc. which interact with the bulk rheological properties of the dope and with the spinning conditions. Spinning speeds can be increased by incorporating appropriate additives or diluents to drop the viscosity of the cellulose acetate/acetone solution. For example U.S. Pat. No. 3,272,638 discloses the addition of sugar to the spinning solution to increase the spinning rate, and U.S. Pat. No. 4,418,026 discloses the addition of poly(ethylene) glycol to the spinning solution to improve the spinnability. The methods of increasing the dry spinning spinnability of cellulose acetate/acetone solution by changing the viscosity of the spinning solution is limited by the thread spinline or threadline strength of the spinning medium. U.S. Pat. No. 3,952,081 discloses an alternative method of increasing the spinning speed of cellulose acetate fibers that entails partially avoiding the dry spinning process by extruding a solution of cellulose acetate at elevated temperature and at elevated pressure precipitating out insoluble cellulose acetate to form the cellulose acetate filamentary material. Although this method may improve the spinning speed, different equipment would be needed since dry spinning at mild conditions is the current method of producing cellulose acetate fibers.

It would be very desirable to be able to further increase the production speed of cellulose ester shaped articles by solvent evaporation techniques at mild conditions. It would be particularly desirable to be able to increase the dry spinning speed of a cellulose ester fiber beyond the speeds currently available limited by the current spinline strength.

SUMMARY OF THE INVENTION

The extrudable solution of the present invention comprises a homogenous mixture of cellulose ester, solvent, metal oxide precursor, acid, and water. This extrudable solution can be extruded such as by dry casting or by dry spinning at significantly increased speeds producing a shaped article containing metal oxide interpenetrating networks.

DETAILED DESCRIPTION OF THE INVENTION

Applicants have unexpectedly discovered that by incorporating an amount of acid, water, and metal oxide precursor into an extrudable solution such as cellulose acetate/acetone spinning solution that the production speed is significantly increased without aggravating the tensile properties of the resulting materials. This increased speed is believed to be the result of a reduction in viscosity of the production spinning solution, (below normal lower limits) while maintaining or increasing the concentration of cellulose esters and other non-volatiles in the spinning solution. Lower viscosity and higher solids allow higher production rates without the need to alter equipment or production parameters. The present invention, while increasing production speeds, permits the use of the same gear pump speeds, piping configuration, acetone recovery, and filtration equipment as used in the existing plant. The addition of the metal oxide precursor not only has a dilution effect on the spinning solution but it is believed that it also enhances the threadline strength through the in-situ polymerization of the metal oxide precursor in the solution as it is extruded forming metal oxide interpenetrating networks.

The shaped articles produced according to the present invention are generally films and fibers such as reinforced films, yarn filaments, and cellulose acetate fibers for use in felt tip pens and air filters such as cigarette filters, etc.

The extrudable solution according to the present invention comprises a homogeneous mixture of:

(a) about 10 to 40 weight percent cellulose ester based on the totals of (a), (b), and (c);

(b) about 40 to 90 weight percent cellulose ester solvent based on the totals of (a), (b), and (c);

(c) up to about 30 weight percent metal oxide precursor, based on the totals of (a), (b), and (c), of the formula $MX_n$ or $MRX_{n-1}$ wherein M is silicon, titanium, boron, aluminum, zirconium, tin, germanium, tantalum, phosphorus, lead, arsenic, lanthanum, iron indium, copper, yttrium, barium, magnesium or mixtures thereof; R is alkyl or aryl or a substituted alkyl or aryl of 1 to 20 carbon atoms; X is halogen, alkoxy, aryloxy, carboxy, or an $—NR'_2$ group in which R' is hydrogen, alkyl, or aryl; and n is the valence of the metal;

(d) acid, the molar ratio of acid expressed as hydronium ions $H_3O^+$ to mole metal oxide precursor being between about 0.0005 and 0.02; and (e) water, the molar ratio of water to metal
oxide precursor being between about 1 and 20;
wherein said solution has a zero-shear viscosity at 29° C. between about 100 and 10,000 poise.

The process of producing the extrudable solution entails forming a mixture of (a) and (b); adding (c); and adding (d) and (e) as acid in aqueous solution. This process comprises:

(i) forming a mixture of cellulose ester (a) and cellulose ester solvent (b);

(ii) adding a metal oxide precursor (c) to form a homogeneous mixture of about 10 to 40 weight percent (a), about 40 to 90 weight percent (b) and up to 30 weight (c) wherein said metal oxide precursor (c) is of the formula $MX_n$ or $MRX_{n-1}$ wherein M is silicon, titanium, boron, aluminum, zirconium, tin, germanium, tantalum, phosphorus, lead, arsenic, lanthanum, iron, indium, copper, yttrium, barium, magnesium or mixtures thereof; R is alkyl or aryl or a substituted alkyl or aryl of 1 to 20 carbon atoms; X is halogen, alkoxy, aryloxy, carboxy, or an $-NR'_2$ group in which R' is hydrogen, alkyl, or aryl; and n is the valence of the metal; and (iii) adding an aqueous acid, the molar ratio of acid expressed as hydronium ions $H_3O^+$ to mole metal oxide precursor being between about 0.0005 and 0.02 and the molar ratio of water to metal oxide precursor being between about 1 and 20;

wherein said extrudable solution has a zero-shear viscosity at 29° C. between and about 100 and 10,000 poise.

The process for producing the shaped articles such as cellulose acetate fiber comprises:

(I) homogeneously mixing (a), (b), (c), (d), and (e) above to form a solution;

(II) filtering to form a spinning solution; and (III) spinning said spinning solution at 200-1500 m/min at 25°-60° C. through spinneret holes having a hole area equivalent to a circular diameter of 25-100 microns and length to diameter ratio between 0.5 and 3, forming filaments with dry linear densities of 0.5 to 8 denier per filament and a total product denier of 10,000 to 50,000 denier.

The process of the present invention results in shaped articles such as cellulose ester fibers containing metal oxide interpenetrating networks. The cellulose esters in the extrudable solution of the present invention are cellulose acetates that preferably have a degree of substitution of 2 to 3 of acetyl and an inherent viscosity in acetone of 1.2 to 1.7 dl/gram. These cellulose acetates more preferably have a degree of substitution of 2.5 and an inherent viscosity of 1.5 dl/gram.

The extrudable solution according to the present invention contains about 10 to 40 weight percent cellulose ester and about 40 to 90 weight percent cellulose ester solvent. An amount much below 10 percent cellulose ester is ineffective in spinning and an amount over 40 weight percent cellulose ester is too viscous to extrude, spin, filter, and convey. This solution also contains up to about 30 weight percent of the metal oxide precursor but preferably at least 1 percent. An amount of metal oxide precursor below about 1 percent does not impart a significant increase in spinning speed where as an amount much over 30 weight percent is not economical and can cause an inhomogeneous spinning solution. The extrudable solution preferably contains about 20 to 30 weight percent cellulose ester, about 45 to 75 weight percent cellulose ester solvent, and about 5 to 25 weight percent metal oxide precursor. The extrudable solution according to the present invention more preferably contains about 25 weight percent cellulose ester, about 55 to 65 weight percent cellulose ester solvent, and about 10 to 20 weight percent metal oxide precursor.

The cellulose ester solvents are preferably selected from polar solvents such as acetic acid, tetrahydrofuran, methylene chloride, and acetone. The most preferred cellulose ester/solvent mixtures are cellulose triacetate/methylene chloride/methanol, and cellulose acetate/acetone/water.

The metal oxide precursor is an energy rich metal organic precursor. It hydrolyzes with water such that the organic portion forms the more thermodynamically stable protonated species, such as an organic alcohol. The multivalent metal forms an extensive metal oxide network such as a silicon oxide network in which each silicon atom is bonded to four oxygen atoms. The degree of interpenetration of the metal oxide network into the cellulose ester matrix is a function of the degree of mixing and the reaction rate. The rate of conversion is increased by the addition of an appropriate level of acid catalyst, the proton of which being the major catalytic agent. The use of a metal oxide precursor is disclosed in U.S. Pat. No. 5,010,128 the disclosure of which is incorporated herein by reference. The metal oxide precursor is generally of the formula $MX_n$ or $MRX_{n-1}$ wherein M is silicon, titanium, boron, aluminum, zirconium, tin, germanium, tantalum, phosphorus, lead, arsenic, lanthanum, iron, indium, copper, yttrium, barium, magnesium or mixtures thereof; R is alkyl or aryl or a substituted alkyl or aryl of 1 to 20 carbon atoms; X is halogen, alkoxy, aryloxy, carboxy, or an $-NR'_2$ group in which R' is hydrogen, alkyl, or aryl; and n is the valence of the metal. The metal oxide precursor is preferably a silicon, titanium, zirconium, or aluminum oxide precursor with silicon oxide precursor being most preferred. The metal oxide precursor is preferably a metal alkoxide. The metal alkoxide can also contain an aryl group. The alkyl group of the metal alkoxide is preferably selected from, methyl, ethyl, and propyl. The more preferred metal alkoxides are selected from tetraethoxysilane, tetramethoxysilane, phenyltriethoxysilane, phenyltrimethoxysilane, methyltriethoxysilane, aminopropyltriethoxysilane, and propyltriethoxysilane.

The amount of acid incorporated in the extrudable solution of the present invention is a ratio depending upon the content of metal oxide precursor. The molar ratio of acid is expressed as moles of $H_3O^+$ to moles of metal oxide precursor and is between about 0.0005 and 0.02 more preferably between about 0.001 and 0.01 with between about 0.002 and 0.008 being most preferred.

The amount of water used in the solution of the present invention is preferably expressed as a molar ratio depending upon the amount of metal oxide precursor present. This molar ratio of water to metal oxide precursor is between about 1 and 20 preferably between about 1 and 10 with between about 2 and 4 being most preferred. The total amount of water present in the solution can also be expressed as a percentage based on the total and is up to about 10 weight percent preferably 1 to 10 weight percent with about 2 to 8 weight percent being most preferred. At least a portion of the water needed in the present invention can be added with the undried cellulose ester and solvent, the remainder of the water being added with the acid. Water is required by the present invention and water by itself lowers the viscosity, but also reduces the strength of the undried extruded material.

The extrudable solution of the present invention can have a viscosity that is below the normal lower limits at which unmodified parent solution can be extruded or spun without breaks in the extruded material or premature fusing of filaments spun from spinnerets of high hole density. It is believed that the lower viscosity permits the increased production speed at the same or higher polymer concentration and the increased strength of the extruded material results from the interpenetrating networks formed around the cellulose ester molecules during extrusion. This extrudable solution generally has a zero shear viscosity at 29° C. between 100 and 10,000 poise. The extrudable solution is preferably a spinning solution that has a zero shear viscosity at 29° C. between about 200 and 4,000 poise more preferably between about 300 and 3,000 poise. This viscosity is most preferably between about 800 and 1,200 poise when using 2 jets in the heating cabinet and between 1,800 and 2,500 poise when using 1 jet in the heating cabinet.

The extrudable solution of the present invention is prepared by adding the materials and sufficiently mixing the materials to produce a homogenous mixture. Any method of mixing is considered to be useful, however mixing cellulose ester/solvent first and then adding metal oxide precursor and aqueous acid is more preferred. The extrudable solution also contain the conventional additives including pigments such as $TiO_2$.

The process of extruding or spinning the solution of the present invention is conducted at a speed of about 200 to 1,500 meter/min preferably about 500 to 1,000 meter/min with about 620 meter/min being more preferred due to the limits of currently available baling equipment. The spinning of the solution of the present invention is conducted at a temperature of about 25° to 60° C. preferably about 45° to 55° C. with about 53° C. being most preferred due to the boiling point of the solvent at atmospheric pressure. The spinning solution of the present invention can be spun through holes in spinnerets of various shapes. These spinneret holes have a preferred area equivalent to a circular diameter of about 25 to 100 μm. This means that the area covered by a cross-section of the hole is equivalent to the area of a circular hole having a diameter of 25 to 100 μm. This diameter is more preferably about 30 to 70 μm. These holes also have a preferred length-to-diameter ratio of about 0.5 to 3 more preferably about 0.5 to 1.

After the fibers are spun the fibers are treated as conventional fibers. The fibers can be lubricated, dried and subjected to standard post processing.

The extrudable solution of the present invention is particularly useful in spinning cellulose acetate/acetone solutions to produce cellulose acetate fibers containing metal oxide interpenetrating networks. These metal oxide interpenetrating networks are formed from the metal oxide precursors.

The resulting fibers of the present invention have an increased elongation when compared to normal unmodified fibers. This elongation is at least 15 percent, more preferably at least 20 percent with about 25 to 30 percent being most preferred. Percent elongation is based on the length of acetate yarn fibers.

The following examples are intended to illustrate the present invention but are not intended to limit the reasonable scope thereof.

EXAMPLES

Maximum takeup speed is determined by a takeup roll with 3.1 in. diameter positioned at 32 in. below the spinning capillary.

Tenacity of the spun fiber is determined by ASTM Method D3822-90 with 1 in. gauge length and 0.4 in./min extension rate.

Elongation of the spun fiber is determined by ASTM Method D3822-90 with 1 in. gauge length and 0.4 in./min extension rate.

EXAMPLE 1

(Control)

A spinning solution having an inherent viscosity of 1.52 dl/gram containing approximately 26 grams of undried cellulose acetate (degree of substitution about 2.50) and 74 grams of acetone was mixed by rolling the jar on a roll mixer for several days or until a homogeneous solution was obtained. The solution prepared thereby was spun at 29° C. on a capillary rheometer with a capillary of 0.027 in. diameter and 0.135 in. length. The shear rate inside the capillary was 750 $sec^{-1}$. The maximum takeup speed of the unmodified spinning solution was 75 ft/min. The tenacity was 0.91 g/denier and the elongation was 16.8%. Viscosity of this solution was 154 poise at 750 $sec^{-1}$.

EXAMPLE 2

A spinning solution containing approximately 26 grams of cellulose acetate in 74 grams of acetone as prepared in Example 1, was mixed with 26 grams of tetraethoxysilane containing 4.5 milliliters of a 0.1N hydrochloric acid solution. The final solution was mixed by rolling the jar on a roll-mixer for at least one day. The solution prepared thereby was spun at 29° C. on a capillary rheometer with a capillary of 0.027 inch diameter and 0.135 inch length. The shear rate inside the capillary was 750 $sec^{-1}$. The maximum takeup speed of the spinning solution modified with tetraethoxysilane was 250 ft/min which is a 230% increase from the spinning speed of unmodified parent spinning solution which was 75 ft/min. The tenacity of the fiber from this modified solution was 0.88 g/denier, comparable to 0.91 g/denier for the unmodified parent solution. The elongation of the fiber from the modified solution was 24.5% while that for the parent solution was 16.8%. Viscosity of this spinning solution was 88 poise at 750 $sec^{-1}$.

EXAMPLE 3

A spinning solution containing approximately 26 grams of cellulose acetate in 74 grams of acetone as prepared in Example 1 was mixed with 1.4 grams of tetraethoxysilane containing 0.5 milliliter of a 0.1N hydrochloric acid solution. The final solution was mixed by rolling the jar on a roll-mixer for at least one day. The solution prepared thereby was spun at the same conditions as in Example 1. The maximum takeup speed of this modified spinning solution was 80 ft/min which is a 7% increase from the spinning speed of unmodified parent spinning solution. The tenacity of the fiber from this solution was 0.80 g/denier and elongation was 17.5%. Viscosity of this spinning solution was 146 poise at 750 $sec^{-1}$.

EXAMPLE 4

A spinning solution containing approximately 26 grams of cellulose acetate in 74 grams of acetone as prepared in Example 1 was mixed with 26 grams of tetramethoxysilane containing 4.5 milliliters of a 0.1N hydrochloric acid solution. The final solution was mixed by rolling the jar on a roll-mixer for at least one day. The solution prepared thereby was spun at the same conditions as in Example 1. The maximum takeup speed of this modified spinning solution was 185 ft/min which is a 147% increase from the spinning speed of unmodified parent spinning solution. The tenacity of the fiber from this solution was 0.83 g/denier and elongation was 18.3%. Viscosity of this spinning solution was 95 poise at 750 sec$^{-1}$.

EXAMPLE 5

A spinning solution containing approximately 26 grams of cellulose acetate in 74 grams of acetone as prepared in Example 1 was mixed with 26 grams of phenyltriethoxysilane containing 4.5 milliliters of a 0.1N. hydrochloric acid solution. The final solution was mixed by rolling the jar on a roll-mixer for at least one day. The solution prepared thereby was spun at the same conditions as in Example 1. The maximum takeup speed of this modified spinning solution was 180 ft/min which is a 140% increase from the spinning speed of unmodified parent spinning solution. The tenacity of the fiber from this solution was 0.89 g/denier and the elongation was 17.9%. Viscosity of this spinning solution was 95 poise at 750 sec$^{-1}$.

EXAMPLE 6

(Comparative—No Acid)

A spinning solution containing approximately 26 grams of cellulose acetate in 74 grams of acetone as prepared in Example 1 was mixed with 2.9 grams of tetraethoxysilane only. The solution was mixed by rolling the jar on a roll-mixer for at least one day. The solution prepared thereby would not spin at the same spinning condition as in Example 1.

EXAMPLE 7

(Comparative—No Tetraethoxysilane)

A spinning solution containing approximately 26 grams of cellulose acetate in 74 grams of acetone as prepared in Example 1 was mixed with 4.5 milliliters of a 0.1N hydrochloric acid solution. The solution was mixed on a roll-mixer for at least one day. The solution prepared thereby was spun at the same condition as in Example 1. The maximum takeup speed was 70 ft/min which is about 7% decrease from the spinning speed of unmodified parent spinning solution.

EXAMPLE 8

(Comparative—Prepolymerized Silicon Oxide)

A spinning solution containing about 26 grams of cellulose acetate and 74 grams of acetone as prepared in Example 1 was homogeneously mixed with 20 grams of polyphenylpropyl silsesquioxane (obtained from Hüls Chemical) containing 73 mole % phenylsilicon oxide and 27 mole % propylsilicon oxide. The solution prepared thereby did not improve the spinning speed from that of the unmodified solution described in Example 1.

The tenacity of the fiber spun from this solution was 0.64 g/denier and the elongation was 12.33%.

The invention has been described in detail with particular reference to preferred embodiments thereof, but it will be understood that variations and modifications can be effected within the spirit and scope of the invention.

We claim:

1. A process for the production of cellulose acetate fibers comprising:
    (I) homogeneously mixing to form a solution
        (a) about 10 to 40 weight percent based on the totals of (a), (b), and (c), cellulose acetate;
        (b) about 40 to 90 weight percent based on the totals of (a), (b), and (c), acetone;
        (c) about up to 30 weight percent based on the totals of (a), (b), and (c), metal oxide precursor of the formula $MX_n$ or $MRX_{n-1}$ wherein M is silicon, titanium, boron, aluminum, zirconium, tin, germanium, tantalum, phosphorus, lead, arsenic, lanthanum, iron, indium, copper, yttrium, barium, magnesium or mixtures thereof; R is alkyl or aryl or substituted alkyl or aryl of 1 to 20 carbon atoms; X is halogen, alkoxy, aryloxy, carboxy, or an —$NR'_2$ group in which R' is hydrogen, alkyl, or aryl; and n is the valence of the metal;
        (d) acid, the molar ratio of acid expressed as hydronium ions $H_3O^+$ to mole metal oxide precursor being between about 0.0005 and 0.02; and
        (e) water, the molar ratio of water to metal oxide precursor being between about 1 and 20
    wherein said solution has a zero-shear viscosity at 29° C. between about 200 and 4,000 poise;
    (II) filtering to form a spinning solution; and
    (III) spinning said spinning solution at a solution temperature of 25°-60° C. at 200-1,500 meter/min through spinneret holes having a hole area equivalent to a circular diameter of 25-100 μm and length to diameter ratio of 0.5 to 3, forming filaments with dry linear densities of 0.5 to 8 denier per filament and a total product denier of from 10,000 to 50,000 denier.

2. The process according to claim 1 wherein the solution temperature is 45°-55° C. and the spinning speed is 500-1000 meter/min.

3. The process according to claim 1 wherein said spinning solution contains about 20 to 30 weight percent cellulose acetate, about 45 to 75 weight percent acetone, and about 10 to 30 weight percent metal oxide precursor.

4. The process according to claim 1 wherein said metal oxide precursor is a metal alkoxide selected from the group consisting of, tetraethoxysilane, tetramethoxysilane, phenyltriethoxysilane, methyltriethoxysilane, aminopropyltriethoxysilane and propyltriethoxysilane.

5. The process according to claim 1 wherein the metal of said metal oxide precursor is selected from the group consisting of silicon, titanium, zirconium, and aluminum.

6. The process according to claim 1 wherein said metal oxide precursor is a metal alkoxide.

* * * * *